United States Patent [19]
Abe et al.

[11] Patent Number: 5,711,738
[45] Date of Patent: Jan. 27, 1998

[54] CONICAL ROLLER BEARING FOR SUPPORTING A PINION SHAFT OF DIFFERENTIAL GEAR

[75] Inventors: Kenichi Abe; Takaaki Shiratani; Akira Ishimaru, all of Kanagawa, Japan

[73] Assignee: NSK Ltd., Tokyo, Japan

[21] Appl. No.: 685,614

[22] Filed: Jul. 24, 1996

[30] Foreign Application Priority Data

Jul. 24, 1995 [JP] Japan ................................ 7-186880

[51] Int. Cl.$^6$ .......................... F16H 48/06; F16C 19/22
[52] U.S. Cl. ...................... 475/246; 74/424; 475/253; 384/571
[58] Field of Search ................... 74/417, 423, 424; 475/246, 253; 384/450, 565, 571

[56] References Cited

U.S. PATENT DOCUMENTS

| | | | |
|---|---|---|---|
| 2,631,904 | 3/1953 | Frenkel | 384/450 |
| 3,690,399 | 9/1972 | Bokovoy et al. | 475/246 X |
| 3,951,483 | 4/1976 | Nakamura | 384/565 |
| 4,824,264 | 4/1989 | Hoebel | 384/571 X |
| 4,867,001 | 9/1989 | Sasaki et al. | 74/424 |
| 4,877,340 | 10/1989 | Hoeprich | 384/571 |
| 4,893,387 | 1/1990 | Akamatsu et al. | 29/121.1 |
| 4,914,979 | 4/1990 | Balmforth | 475/253 X |
| 4,919,551 | 4/1990 | Nonutani et al. | 384/571 X |
| 5,007,747 | 4/1991 | Takeuchi et al. | 384/450 |
| 5,271,679 | 12/1993 | Yamazumi et al. | 384/527 |
| 5,501,636 | 3/1996 | Janke et al. | 74/417 X |

Primary Examiner—Khoi Q. Ta
Assistant Examiner—Peter T. Kwon
Attorney, Agent, or Firm—Sughrue, Mion, Zinn, Macpeak & Seas, PLLC

[57] ABSTRACT

In a conical roller bearing for supporting a pinion shaft of a differential gear, the contact angle α of a conical roller bearing for supporting the pinion shaft is controlled between 22° and 28°; the ratio of the diameter Da of the conical roller at the larger-diameter end face to its length L is controlled between 0.51 and 1.0; and the roller number coefficient k is controlled to range from 1.16 to 1.32. The conical roller bearing constructed thus contributes to better fuel economy on automobiles by fully ensuring the necessary levels of fatigue strength and bearing rigidity and yet reducing the dynamic torque it develops.

8 Claims, 9 Drawing Sheets

CONICAL ROLLER BEARING FOR SUPPORTING A PINION SHAFT OF DIFFERENTIAL GEAR

BACKGROUND OF THE INVENTION

The present invention relates to an improvement of a conical roller bearing for supporting rotatably a pinion shaft as a component of an automotive differential gear (i.e., final reduction gear) within a differential casing.

Figure 1:
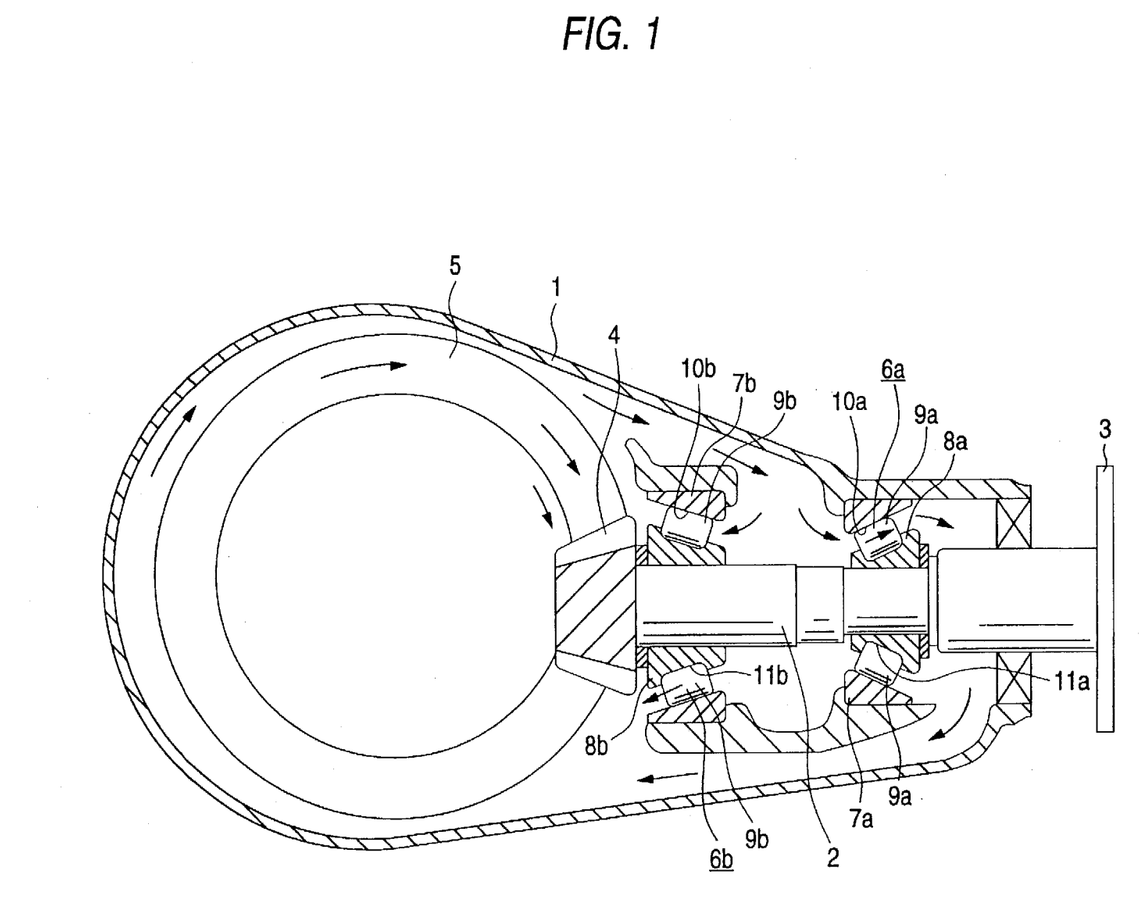
FIG. 1 is a longitudinal sectional view showing a typical differential gear.

An automotive power transmission system has a differential gear that is provided halfway its line not only for slowing down the rotation of a propeller shaft but also for changing the direction of its rotation at right angles. As shown in FIG. 1, the differential gear includes a casing 1 and a pinion shaft 2 that is provided inward and closer to the front end of the casing 1 (i.e., to the right in FIG. 1). A coupling flange 3 is secured to that part of the pinion shaft 2 which is at its front end portion (i.e., the right end portion of FIG. 1) and which protrudes through an opening at the front end of the casing 1. A propeller shaft (not shown) has its rear end portion which is capable of connecting detachably the coupling flange 3. A reduction pinion 4 is secured to the rear end portion (i.e., the left end portion of FIG. 1) of the pinion shaft 2 so that the reduction pinion 4 engages a larger reduction gear 5. The larger reduction gear 5 is only rotatably supported within the rear portion (i.e., the left portion of FIG. 1) of the casing 1. The pinion shaft 2 is rotatably supported with respect to the casing 1 at two positions by a pair of conical roller bearings 6a and 6b arranged in the pinion 2 between the coupling flange 3 and the larger reduction gear 5.

The conical roller bearing 6a (or 6b) includes one outer race 7a (or 7b), one inner race 8a (or 8b) and a plurality of conical rollers 9a (or 9b). The inner circumference of the outer race 7a (or 7b) has an outer raceway 10a (or 10b) formed in a conical concavity. The outer circumference of the inner race 8a (or 8b) has an inner raceway 11a (or 11b) formed in a conical convexity. The outer races 7a and 7b are securely fitted in a part of the casing 1. The inner races 8a and 8b are securely fitted at the front and rear positions around the intermediate portion of the pinion shaft 2.

Figure 2:
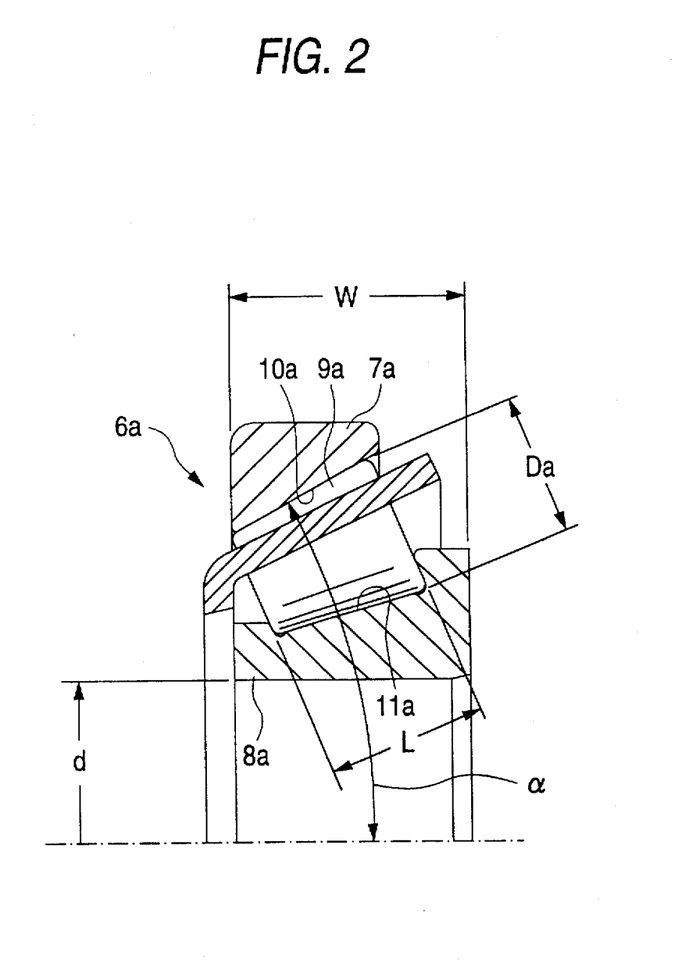
FIG. 2 is a cross-sectional view showing one half of a typical conical roller bearing.

FIG. 2 is an enlarged view of the conical roller bearing 6a for supporting the pinion shaft 2 (see FIG. 1) in the differential gear as described above. The following description also applies to the conical roller bearing 6b. The conical roller bearing 6a incorporated in the conventional differential gear has a contact angle $\alpha$ of about 20°, the contact angle $\alpha$ being the angle which the outer raceway 10a is inclined with respect to the center line through the outer race 7a. The conical bearing 6a has a Da/L value of 0.4 to 0.9, the Da/L value being a ratio of the diameter Da of the larger-diameter end portion of each conical roller 9a to the length L thereof. Depending on the type of an automobile on which the differential gear is mounted or the exact position of its mounting, the diameter of the inner race 8a is varied but within about 55 mm on the conical roller bearing of the type shown in the drawings.

The roller number coefficient k of the conical roller bearing 6a incorporated in the conventional differential gear is about 1.1 to 1.3. The roller number coefficient k represents how closely the conical rollers 9a (or 9b) are packed between the outer raceway 10a (or 10b) and the inner raceway 11a (or 11b) and it is generally the reciprocal of the ratio which is the diameter Da of the larger-diameter end portion of each conical roller 9a (or 9b) to the distance between the centers of any two diametrically positioned conical rollers 9a (or 9b) on a pitch circle for conical rollers arranged at the same interval, and expressed by:

$$k=(d_m/Da)\cdot\sin(180°/z)$$

where $d_m$ is the diameter of the pitch circle for the plurality of conical rollers 9a (or 9b) as measured at their larger-diameter end portion, and z is the number of conical rollers 9a (or 9b). If k=1, the conical rollers 9a (or 9b) are packed with no clearance between adjacent rollers; the value of k increases as the number of packed conical rollers 9a (or 9b) decreases.

The conventional conical roller bearing constructed thus for supporting the pinion shaft of a differential gear can fully satisfy the minimal levels of performance such as fatigue strength and bearing rigidity that are required of conical roller bearings of the type used in a differential gear; however, the rotational torque has not necessarily been small enough to adapt practical applications. Recently, the demand for better fuel economy of automobiles increases severely as the conical roller bearing is required to develop an even smaller rotational torque for the purpose of reducing the loss in power transmission. However, it is not preferable that a smaller rotational torque results in an undue decrease of the fatigue strength or bearing rigidity.

SUMMARY OF THE INVENTION

An object of the present invention is to provide a conical roller bearing for supporting the pinion shaft of a differential gear in that the conical roller bearing maintains the required fatigue strength and bearing rigidity and yet develops a smaller rotational torque.

The conical roller bearing of the present invention for supporting the pinion shaft of a differential gear is similar to the conventional type in that the front end portion of the pinion shaft is capable of connecting detachably the rear end portion of a propeller shaft and the rear end portion of the pinion shaft secures a reduction pinion that engages a larger reduction gear, and in that the pinion shaft is rotatably supported with respect to a casing by a pair of the conical roller bearings at both of front and rear positions in the intermediate portion of the pinion shaft.

The conical roller bearing of the present invention is characterized in that the contact angle $\alpha$ is 22° to 28°, Da/L is 0.51 to 1.0 where Da is the diameter of each conical roller as measured at the larger-diameter end and L is the length of the conical roller, and the roller number coefficient k is 1.16 to 1.32, with $k=(d_m/Da)\cdot\sin(180°/z)$ where $d_m$ is the diameter of a pitch circle for a plurality of conical rollers and z is the number of conical rollers.

The conical roller bearing constructed thus according to the present invention for supporting the pinion shaft of a differential gear ensures satisfactory fatigue strength and bearing rigidity for practical purposes and which yet reduces the rotational torque. Therefore, the conical roller bearing of the invention contributes to better fuel economy of automobiles by reducing the power transmission loss in the differential gear while satisfying its performance requirements.

In a preferred embodiment, the contact angle $\alpha$ is controlled within the range from 26° to 28° and, at the same time, the ratio Da/L is controlled between 0.7 and 1.0 and this contributes to a further reduction in the rotational torque. In another preferred embodiment, the contact angle $\alpha$ is controlled within the range from 22° to 24° while, at the same time, the ratio Da/L is controlled between 0.51 and 0.8 and this offers the advantage of ensuring a satisfactory level of radial rigidity although the reduction in rotational torque is not as significant as in the case where the contact angle α is controlled within the range from 26° to 28°. If the contact angle α is controlled between 24° and 26°, intermediate levels of performance are attained. In yet another preferred embodiment, the larger-diameter end face of each conical roller and the surface of a flange formed on the larger-diameter circumference of the inner race which is in slidable contact with the larger-diameter end face are each controlled to have a surface roughness of no more than 0.1 μRa and this contributes not only to an even smaller rotational torque but also to higher resistance to seizure.

DETAILED DESCRIPTION OF THE INVENTION

The present inventors have made intensive studies in order to provide a conical roller bearing for supporting the pinion shaft of a differential gear that maintains the required fatigue strength and bearing rigidity and which yet develops a smaller rotational torque. First of all, the fatigue strength, bearing rigidity and rotational torque of a conical roller bearing are possibly affected by the following four factors:

(1) roller number coefficient, k;
(2) the diameter of the larger-diameter end portion of a conical roller, Da;
(3) the ratio of Da to the length L of each conical roller, Da/L; and
(4) contact angle, α.

Hence, the present inventors have further studied the effects of these four factors on the fatigue strength, bearing rigidity (in both axial and radial directions) and rotational torque (the smaller, the better) of the conical roller bearing. The results of the study are summarized in Table 1 below. Reference marks "+" and "−" in Table 1 represent the positive or negative effect of a certain factor on a certain item of performance. The marks "+" indicate that the value of a certain factor increases as the performance of interest improves (greater fatigue strength, higher bearing rigidity or smaller rotational torque). Conversely, the marks "−" indicate that the value of a certain factor increases as the performance of interest deteriorates (smaller fatigue strength, lower bearing rigidity or greater rotational torque). The values in the right-hand column represent the applicable ranges of values that can be adopted by the conical roller bearing for supporting the pinion shaft of a differential gear. The roller number coefficient k and Da/L are dimensionless; the diameter Da is in millimeters; and the contact angle α is in degrees (°). It should be noted that the conical roller bearing for use in a differential gear is subjected to both an axial and a radial load during use. The data in Table 1 are prepared on the assumption that equal loads are applied in the two directions.

TABLE 1

| Factor | Fatigue Strength | Bearing Rigidity Radial | Axial | Torque | Applicable values |
|---|---|---|---|---|---|
| k, | — | — | — | + | 1.0–3 |
| $D_a$, | + | — | — | + | 5–30$^{mm}$ |
| $D_a/L$, | — | — | — | + | 0.1–1.2 |
| α, | + | — | + | — | 10°–35° |

As can be seen from Table 1, the fatigue strength, bearing rigidity and rotational torque of the conical roller bearing cannot simultaneously be improved by simply changing the roller number coefficient k, ratio Da/L, diameter Da or contact angle α. Therefore, the present inventors have carried out many experiments to remove this difficulty and have successfully invented a conical roller bearing for supporting the pinion shaft of a differential gear that ensures satisfactory fatigue strength and bearing rigidity for practical purposes and which yet reduces the rotational torque.

Part of the experiments conducted by the present inventors in order to confirm the effectiveness of the invention will now be described. Tables 2A and 2B given below list the specifications of the six types of conical roller bearings that were used in the experiments. The first three types A, B and C were of a comparatively small diameter and intended to support the front side (the right side of FIG. 1) of the intermediate portion of the pinion shaft 2 (see FIG. 1), and the other three types D, E and F were of a comparatively large diameter and intended to support the rear side (the left side of FIG. 1) of the same intermediate portion. Conical roller bearings A and D were of the type incorporated in a conventional differential gear. Conical roller bearings B, C, E and F were of the type within the scope of the invention. All the components (outer race, inner race and conical rollers) of each of the conical roller bearings used in the experiments were made of a high-carbon chromium bearing steel SUJ 2 (JIS G 4805). It should, however, be noted that these components can also be formed of other chromium steels such as SCr 42OH, SCr 43OH and SCr 44OH (JIS G 4052), as well as medium-carbon molybdenum steel and medium-carbon chromium manganese steel. It should also be noted that the components of conical roller bearings need not necessarily be formed of the same material and different components may be formed of different materials.

TABLE 2A

| Bearing No. | Inside diameter, d | Outside diameter, D | Width, W | Roller diameter, Da | Contact angle, α | Roller length, L | Number of rollers, Z | Diameter of roller pitch circle |
|---|---|---|---|---|---|---|---|---|
| A | 34.0 | 73.0 | 26.0 | 8.2 | 20 | 19.5 | 17 | 59.1 |
| B | 34.0 | 73.0 | 26.0 | 9.1 | 23 | 15 | 17 | 59.5 |
| C | 27.0 | 73.0 | 28.0 | 12.4 | 28 | 14 | 11 | 55.5 |
| D | 44.0 | 96.0 | 36.0 | 11.5 | 20 | 25.5 | 18 | 79.0 |
| E | 44.0 | 96.0 | 36.0 | 13.8 | 23 | 24 | 15 | 79.8 |
| F | 39.0 | 96.0 | 38.0 | 16.6 | 28 | 29 | 12 | 74.6 |

TABLE 2B

| Bearing No. | Da/L | Roller Number Coefficient, k |
|---|---|---|
| A | 0.42 | 1.32 |
| B | 0.61 | 1.20 |
| C | 0.89 | 1.26 |
| D | 0.45 | 1.19 |
| E | 0.58 | 1.20 |
| F | 0.57 | 1.16 |

Figure 3:
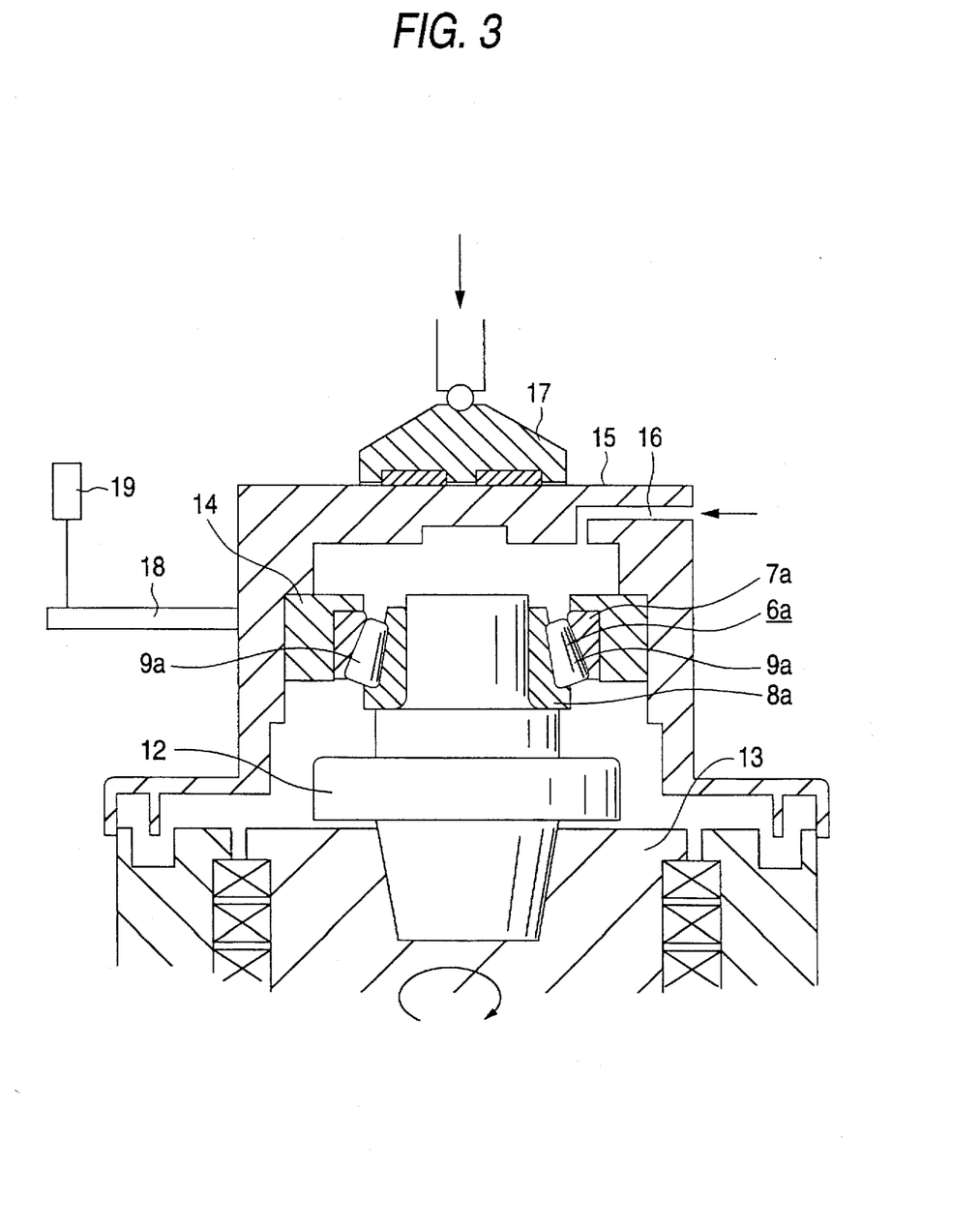
FIG. 3 is a longitudinal sectional view showing an experimental device for measuring the fatigue strength, bearing rigidity and rotational torque of a conical roller bearing.

The six conical roller bearings identified in Tables 2A and 2B, as well as other conical roller bearings were measured for fatigue strength, bearing rigidity and rotational torque by an experimental device including an arrangement shown in FIG. 3. The conical roller bearing 6a (or 6b) had the inner race 8a (or 8b) securely fitted around a holder 12 which, in turn, had its tapered end inserted into the top end portion of a drive shaft 13 for rotational driving of the bearing. The outer race 7a (or 7b) of the bearing was securely fitted within a housing 15 with an outer holder 14 being interposed. The housing 15 was capable of being supplied with a specified lubricant via an oil feed hole 16. The top surface of the housing 15 was equipped with a static pressure pad 17 such that a predetermined axial load could be applied. A load cell 19 was installed between the end of an arm 18 secured to the outer circumference of the housing 15 and a fixed portion (not shown) such that it was capable of measuring the dynamic torque [i.e., the rotational torque of the conical roller bearing 6a (or 6b)] which would be exerted on the housing 15 while the drive shaft 13 was rotating. As already mentioned, the purpose of reducing the dynamic torque is to achieve fuel economy; therefore, a radial load which was less significant for fuel economy was not applied during the dynamic torque measurements. Stated more specifically, a thrust load is constantly exerted during the operation of a differential gear but a great radial load is exerted only in a limited case such as rapid acceleration or deceleration, which accounts for only a small portion of the whole operating time. Therefore, the change in dynamic torque due to the radial load causes a smaller effect on the fuel economy than the change due to the thrust load. It was for this reason that only the thrust load was applied during experiments for dynamic torque measurement.

Figure 4:
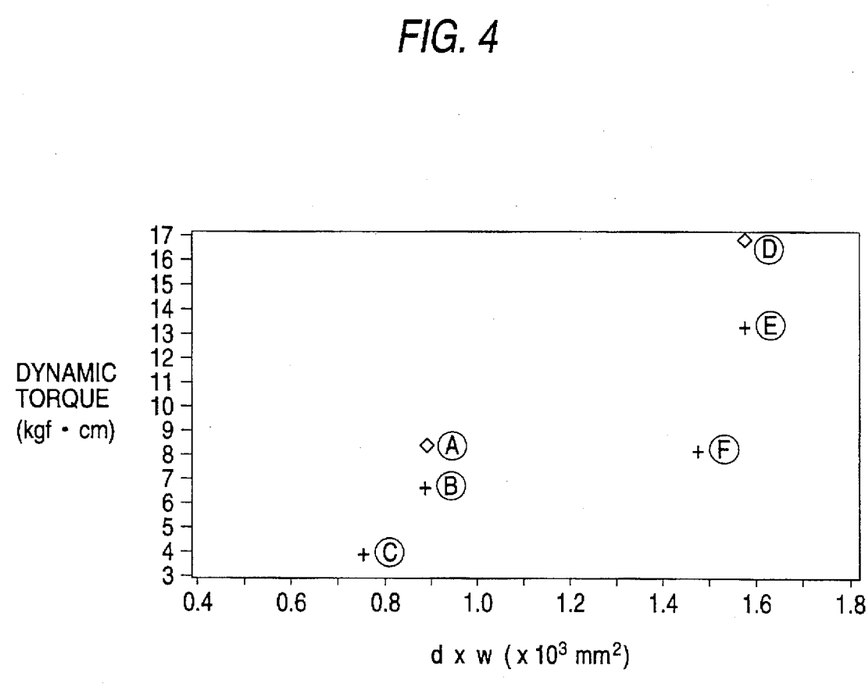
FIG. 4 is a diagram showing the relationship between the size of various conical roller bearings and the dynamic torque they develop.

The result of a first experiment is shown in FIG. 4, which illustrates the relationship between the dynamic torque (=rotational torque) of the bearing and the product of the inside diameter (d) of the conical roller bearing and the assembly width W (see FIG. 1). The horizontal axis of the graph in FIG. 4 plots the product of d and W and the vertical axis plots the dynamic torque of the conical roller bearing developed when the drive shaft 13 (see FIG. 3) was rotated at 3,000 rpm. Encircled symbols A to F are keyed to the symbols appearing in the left-hand column of Tables 2A and 2B. The decreased value of d×W indicates that the conical roller bearing of interest is small-sized. It is clear from FIG. 4 that given the same size, the conical roller bearings of the invention for supporting the pinion shaft of a differential gear developed smaller dynamic torques than the conventional types.

Figure 5A:
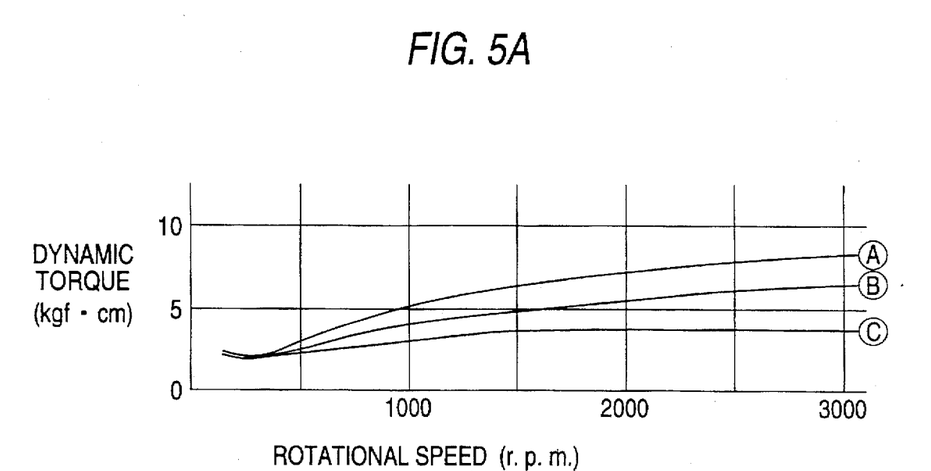
FIGS. 5A and 5B show graphically the relationship between the dynamic torque and rotational speed for various conical roller bearings.
Figure 5B:
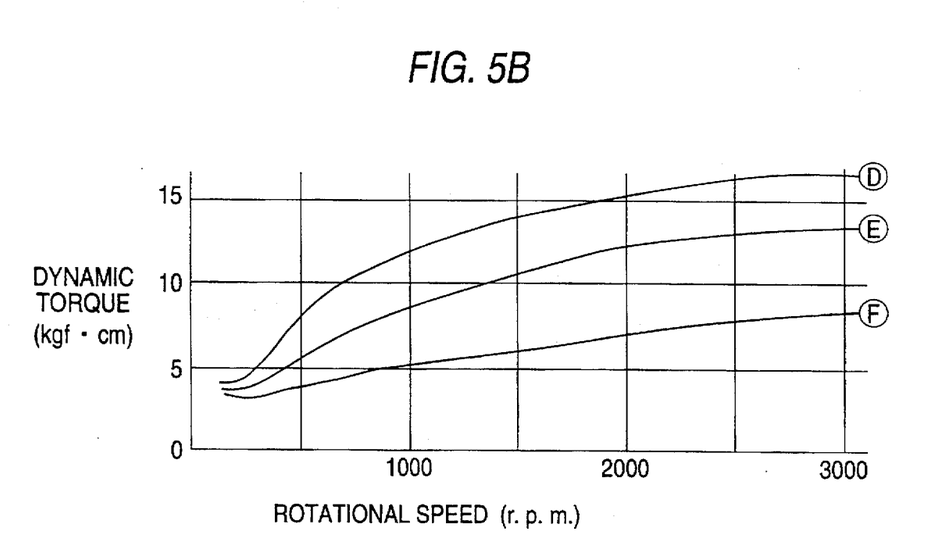

FIGS. 5A and 5B show the results of experiments carried out to determine the relationship between the dynamic torque and rotational speed for the conical roller bearings A to F. In the experiments, gear oil #90 heated at 80° C. was supplied at a rate of 600 cc/min to each conical roller bearing as it was placed under an axial load of 300 kgf. FIG. 5A shows the results of experiments on the conical roller bearings of a comparatively small diameter which were intended to support the front side of the intermediate portion of the pinion shaft 2, and FIG. 5B shows the results of experiments on the conical roller bearings of a comparatively large diameter which were intended to support the rear side of the same intermediate portion. Evidently, the conical roller bearings of the present invention for supporting the pinion shaft of a differential gear developed smaller dynamic torques than the conventional types.

Thus, the conical roller bearing of the invention is capable of reducing the dynamic torque by controlling the contact angle α within 22° to 28°, preferably within 26° to 28° or 22° to 24°, the ratio of Da to L (Da=the diameter of each conical roller as measured at the larger-diameter end portion; L=the length of the conical roller) within 0.51 to 1.0, preferably within 0.7 to 1.0 or 0.51 to 0.8, and the roller number coefficient k within 1.16 to 1.32. For further reducing the dynamic torque and yet ensuring that no seizure will occur even under extremely poor lubrication, it is effective to control the larger-diameter end face of each conical roller and the surface of a flange formed on the larger-diameter circumference of the inner race which is in slidable contact with the larger-diameter and face such that each of them has a surface roughness of no more than 0.1 μRa. Two experiments were carried out in order to evaluate the effectiveness of thus controlling the surface roughness of these surfaces and the results of the experiments will now be described with reference to FIGS. 6 and 7.

Figure 6:
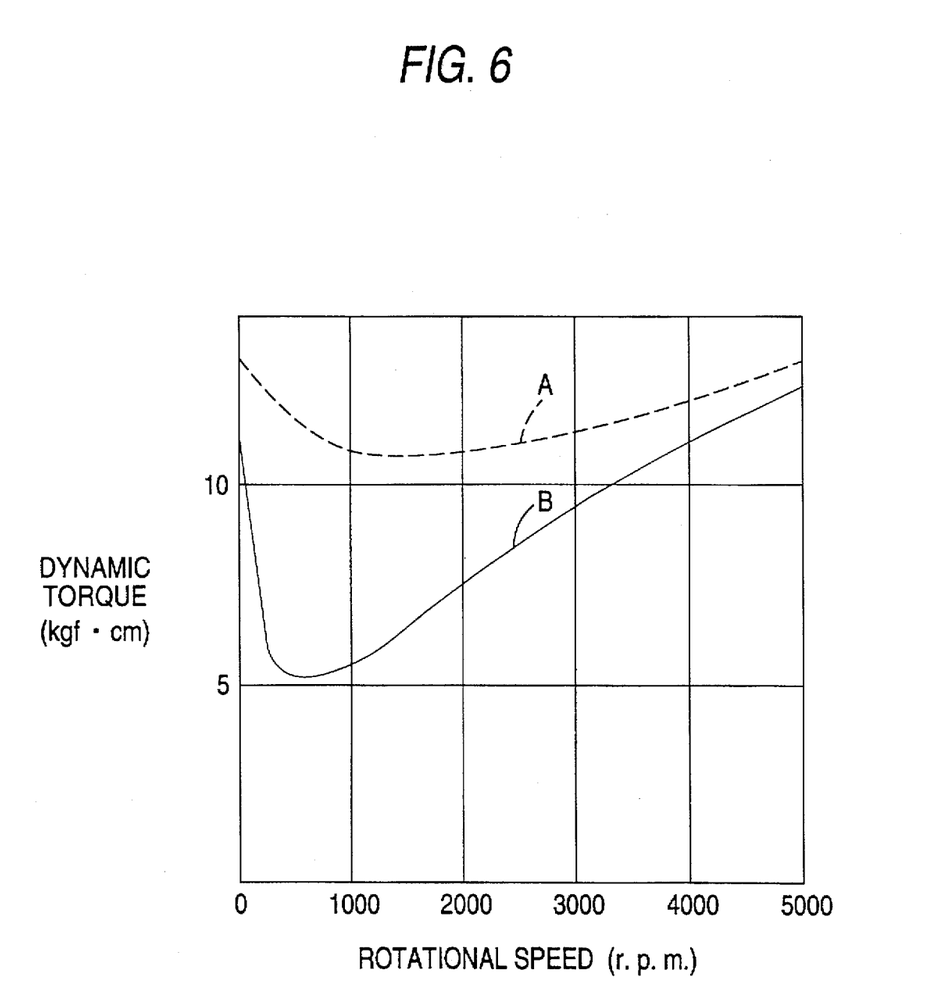
FIG. 6 is a graph showing the relationship between the dynamic torque and rotational speed with the surface roughness of mating surfaces in slidable contact being taken as a parameter.

The first experiment was for determining the effect of the defined surface roughness on the dynamic torque; in this experiment, gear oil #90 heated at 80° C. was supplied at a rate of 600 cc/min to conical roller bearings having the specifications of type B in Tables 2A and 2B as they were placed under an axial load of 900 kgf. The relationship thus determined between the dynamic torque and rotational speed is shown in FIG. 6, in which the dashed line A refers to the result of a comparative example in which both of the stated surfaces had a surface roughness of 0.3 μRa whereas the solid line B refers to the result of an inventive example in which both of the stated surfaces had a surface roughness of 0.1 µRa. Obviously, the dynamic torque developing in the practical range of rotational speeds could be markedly reduced by controlling both of the stated surfaces to have a surface roughness of no more than 0.1 µRa. It should be mentioned here that the experiments of the results which are shown in FIGS. 4 and 5 were carried out with both of the stated surfaces being controlled to have a surface roughness of no more than 0.1 µRa.

Figure 7:
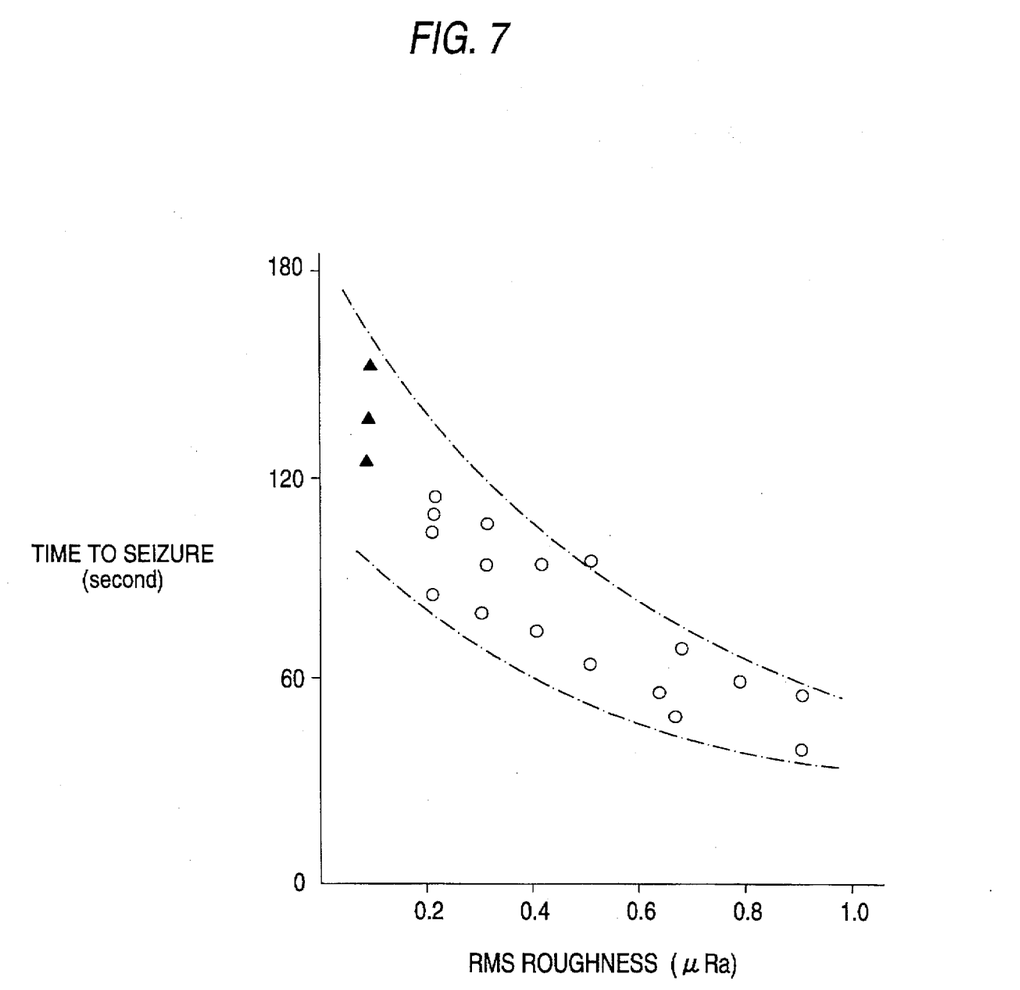
FIG. 7 is a graph showing how the surface roughness of mating surfaces in slidable contact affects the resistance of conical roller bearings against seizure.

FIG. 7 shows how the surface roughness of the stated surfaces affects the resistance to seizure. In the anti-seizure experiment, 0.2 cc of gear oil #90 was deposited on a conical roller bearing under test, which was rotated at 4,000 rpm under an axial load of 1,000 kgf and the time to seizure was measured. The result of this experiment is shown in FIG. 7, in which the vertical axis plots the time in seconds that was taken for seizure to occur and the horizontal axis plots the RMS (root mean square) roughness of the stated surfaces [={(surface roughness of the larger-diameter end face of conical roller)$^2$+(surface roughness of the surface of a flange formed on the larger-diameter circumference of the inner race which is in slidable contact with the larger-diameter end face)$^2$}$^{1/2}$]. The solid triangles "▲" in FIG. 7 refer to the result of the experiment on the conical roller bearings which had the surface roughness of the stated surfaces controlled not to exceed 0.1 µRa, and the open circles "○" refer to the result of the experiment on the conical roller bearings which had both of the stated surfaces controlled to have values grater than 0.1 µRa.

As is clear from FIGS. 6 and 7, the dynamic torque in the practical range of rotational speeds can be markedly reduced while improving the resistance to seizure by controlling both of the stated surfaces to have a surface roughness not exceeding 0.1 µRa.

As described above, the conical roller bearing of the present invention for supporting the pinion shaft of a differential gear produces smaller dynamic torques than the conventional type. As a further advantage, the conical roller bearing of the invention is capable of ensuring sufficient levels of fatigue strength and bearing rigidity to be satisfactory for practical purposes. The fatigue strength and bearing rigidity of conical roller bearings can be evaluated by calculation on values for the specifications of bearings set forth in Tables 2A and 2B (see above).

Figure 8:
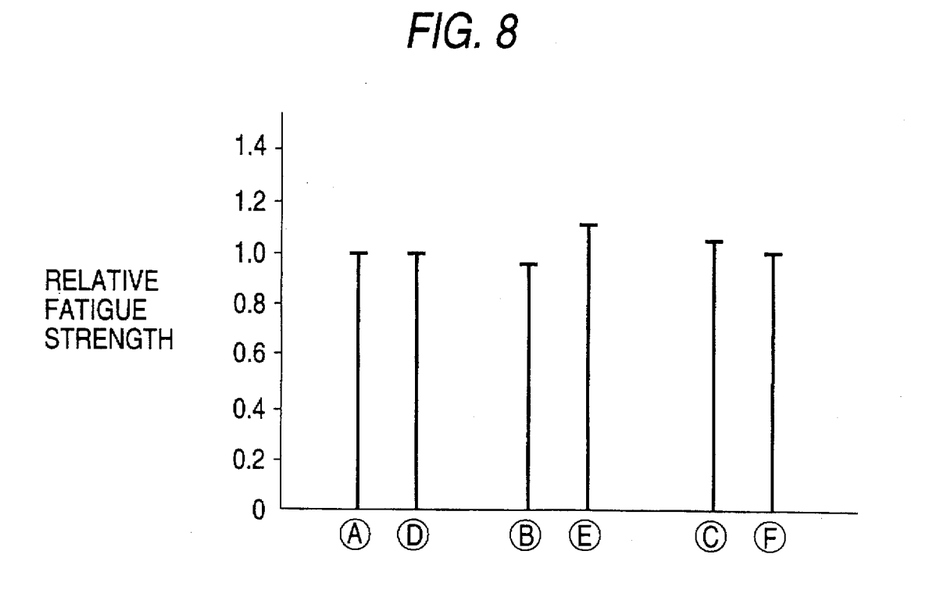
FIG. 8 is a graph comparing the fatigue strengths of various conical roller bearings.

FIG. 8 shows the fatigue strength of each of the six conical roller bearings A to F as determined by calculation on the basis of the data set forth in Tables 2A and 2B (see above). The vertical axis of the graph in FIG. 8 plots the relative fatigue strengths of the conical roller bearings under test, with the value for the conventional types A and D being taken as unity. As one can see from FIG. 8, the conical roller bearings of the invention for supporting the pinion gear of a differential gear guarantee fatigue strengths almost comparable to those of the conventional types.

Figure 9:
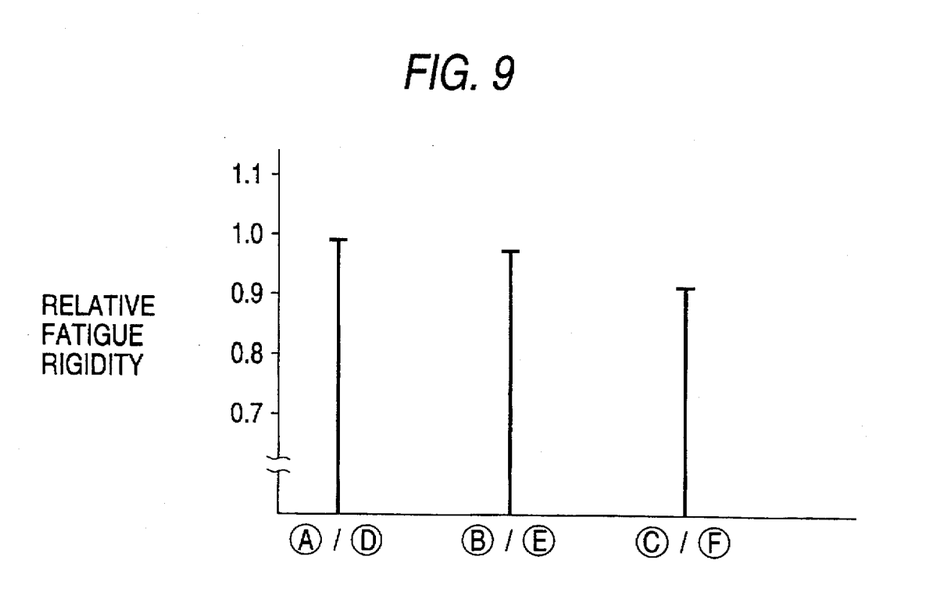
FIG. 9 is a graph comparing the axial bearing rigidity values of various combinations of conical roller bearings.

Another experiment was carried out for evaluation of bearing rigidity and the result is shown in FIG. 9. In the experiment, two conical roller bearings were selected from among the six types A to F set forth in Tables 2A and 2B and mounted in both of front and rear positions in the intermediate portion of the pinion shaft 2 (see FIG. 1); the selected pairs were A/D, B/E and C/F and the axial bearing rigidity of each bearing under test was calculated with the pinion shaft 2 being rotatably supported on the bearing. The vertical axis of the graph in FIG. 9 plots the relative axial bearing rigidity of the bearing combinations in support of the pinion shaft 2, with the value for the combination of conventional types A and D being taken as unity. The value on the vertical axis decreases as the bearing rigidity of a bearing combination of interest increases, because the bearing rigidity is expressed as the relative amount of displacement that occurs in response to the application of a specified axial load. As one can see from FIG. 9, the conical roller bearings of the invention which support the pinion shaft 2 exhibit axial bearing rigidity values at least comparable to that achieved by the combination of the conventional types.

Figure 10:
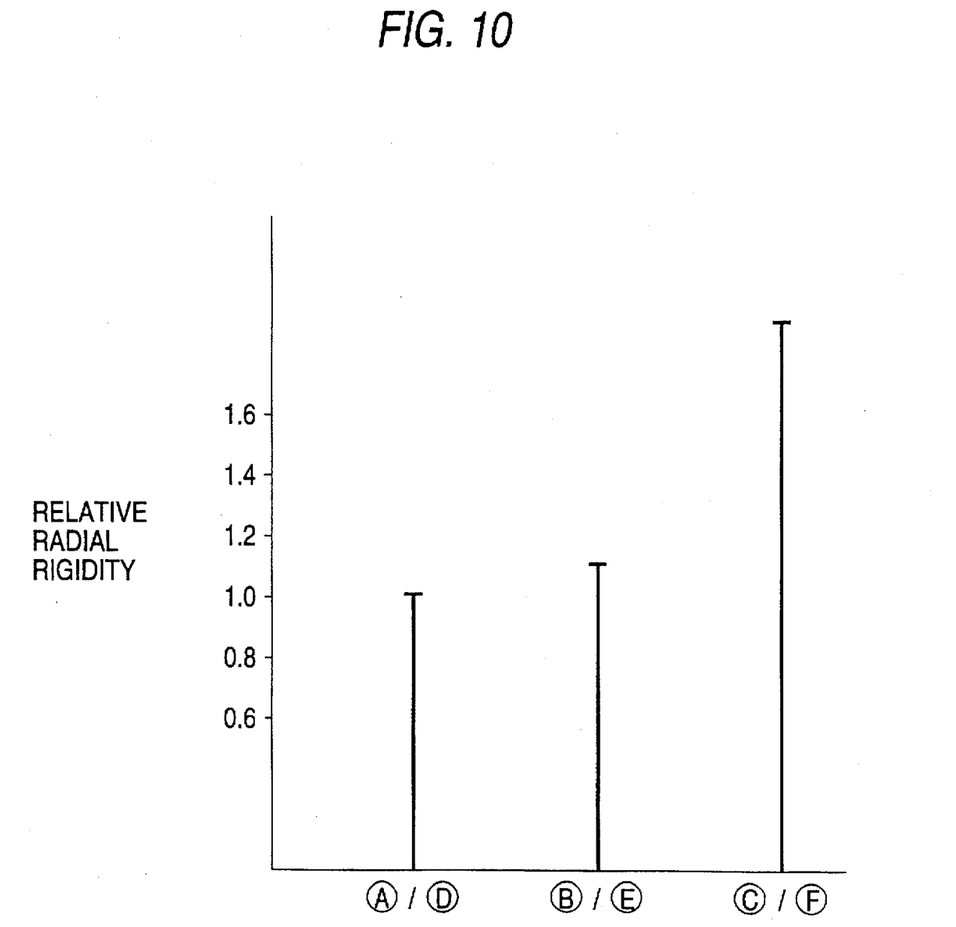
FIG. 10 is a graph comparing the radial bearing rigidity values of various combinations of conical roller bearings.

FIG. 10 shows the results of calculations of radial bearing rigidity that were performed under the same conditions as employed for preparing the data set forth in FIG. 9. Again, the value on the vertical axis of the graph in FIG. 10 decreases as the bearing rigidity of a bearing combination of interest increases, because the bearing rigidity is expressed as the relative amount of displacement that occurs in response to the application of a specified radial load. Obviously, the conical roller bearings of the invention which support the pinion shaft 2 exhibit lower values of radial bearing rigidity than the combination of the conventional types. Like the combination of the conventional types A and E, the combination of types B and E is suitable for use with a differential gear in an automobile that carries a high-power engine; on the other hand, the combination of types C and F is suitable for use with a differential gear in an automobile that carries a small-power engine.

By consideration of the above conducted experiments, it was ascertained that the conical roller bearing having the structural characteristics of the contact angle α of 22° to 28°, Da/L of 0.51 to 1.0, and the roller number coefficient k of 1.16 to 1.32 could obtain superior results. Further, Table 3 set forth below indicates vertexes G1 to G8 constituting each of upper and lower limits with respect to the factors of the contact angle, Da/L and the roller number coefficient.

TABLE 3

| Vertex | Contact angle, α | Da/L | Roller Number Coefficient, k |
| --- | --- | --- | --- |
| G1 | 22 | 0.51 | 1.16 |
| G2 | 22 | 0.51 | 1.32 |
| G3 | 22 | 1.0 | 1.16 |
| G4 | 22 | 1.0 | 1.32 |
| G5 | 28 | 0.51 | 1.16 |
| G6 | 28 | 0.51 | 1.32 |
| G7 | 28 | 1.0 | 1.16 |
| G8 | 28 | 1.0 | 1.32 |

It was ascertained that the conical roller bearing having the structural characteristics at each of the vertexes G1 to G8 could also obtain superior results similar to the types B, C, E and F where the contact surface has the surface roughness of no more than 0.1 µRa in the larger-diameter end face of the conical roller and the surface of the flange formed on the larger-diameter circumference of the inner race. Accordingly, the structural characteristics of the present invention are within the range formed by the vertexes G1 to G8.

As constructed and operating in the manner described above, the conical roller bearing of the present invention for supporting the pinion shaft of a differential gear contributes to improve the fuel economy of automobiles by satisfying the performance requirements of the differential gear and yet reducing the loss of power in transmission through the gear.

What is claimed is:

1. A conical roller bearing for supporting a pinion shaft of a differential gear, comprising:

an inner race having an inner raceway in an outer circumference of the inner race, and fitted around the pinion shaft;

an outer race having an outer raceway in an inner circumference of the outer race; and a plurality of conical rollers arranged rollingly between the inner raceway and the outer raceway at a contact angle which the outer raceway is inclined with respect to a center line through the outer race, wherein the contact angle is 22° to 28°, a Da/L value of Da to L is 0.51 to 1.0 where Da is a large diameter of each conical roller and L is a length of each conical roller, and a roller number coefficient defined by $k=(d_m/Da) \cdot \sin(180°/z)$ is 1.16 to 1.32 where $d_m$ is a diameter of a pitch circle in which the conical rollers are arranged and z is the number of conical rollers.

2. The conical roller bearing of claim 1, wherein the contact angle is 26° to 28° and the Da/L value is 0.7 to 1.0.

3. The conical roller bearing of claim 1, wherein the contact angle is 22° to 24° and the Da/L value is 0.51 to 0.8.

4. The conical roller bearing of claim 1, wherein each of the conical rollers includes an end face having the larger-diameter and the inner race includes a flange formed on a larger-diameter circumference of the inner race, the flange having a contact surface which is in slidable contact with the end face, the end face and the contact surface having a surface roughness of no more than 0.1 μRa.

5. A differential gear device for an automobile, comprising:

a casing;

a pinion shaft arranged in the casing;

a reduction gear supported rotatably within the casing;

a reduction pinion engaging the reduction gear and secured to a rear end portion of the pinion shaft; and a pair of conical roller bearings for supporting the pinion shaft rotatably with respect to the casing at front and rear positions of the pinion shaft, each of the conical roller bearings comprising:

an inner race having an inner raceway in an outer circumference of the inner race, and fitted around the pinion shaft;

an outer race having an outer raceway in an inner circumference of the outer race; and a plurality of conical rollers arranged rollingly between the inner raceway and the outer raceway at a contact angle which the outer raceway is inclined with respect to a center line through the outer race, wherein the contact angle is 22° to 28°, a Da/L value of Da to L is 0.51 to 1.0 where Da is a large diameter of each conical roller and L is a length of each conical roller, and a roller number coefficient defined by $k=(d_m/Da) \cdot \sin(180°/z)$ is 1.16 to 1.32 where $d_m$ is a diameter of a pitch circle in which the conical rollers are arranged and z is the number of conical rollers.

6. The differential gear device of claim 5, wherein the contact angle is 26° to 28° and the Da/L value is 0.7 to 1.0.

7. The differential gear device of claim 5, wherein the contact angle is 22° to 24° and the Da/L value is 0.51 to 0.8.

8. The differential gear device of claim 5, wherein each of the conical rollers includes an end face having the larger-diameter and the inner race includes a flange formed on a larger-diameter circumference of the inner race, the flange having a contact surface which is in slidable contact with the end face, the end face and the contact surface having a surface roughness of no more than 0.1 μRa.

* * * * *